United States Patent [19]

Franks, Jr.

[11] Patent Number: 5,322,132
[45] Date of Patent: Jun. 21, 1994

[54] TWIN DROP WIRE CLAMP ASSEMBLY AND METHOD

[76] Inventor: George J. Franks, Jr., 127 Duntrune, Inverness, Ill. 60067

[21] Appl. No.: 787,854

[22] Filed: Nov. 5, 1991

[51] Int. Cl.⁵ .............................................. F16G 11/04
[52] U.S. Cl. .................... 174/41; 24/136 R
[58] Field of Search ............... 24/136 R, 115 M; 403/211, 314, 374, 409.1; 248/231.3, 316.2, 61, 74.1; 174/40 R, 40 CC, 40 TD, 41, 43, 45 R; 439/451

[56] References Cited

U.S. PATENT DOCUMENTS

| | | |
|---|---|---|
| 116,632 | 7/1871 | Riley .................................. 24/136 R |
| 1,793,140 | 2/1931 | Steinmayer . |
| 1,859,561 | 5/1932 | Haworth ............................. 403/211 |
| 2,131,171 | 9/1938 | Fotsch . |
| 2,781,212 | 2/1957 | Jugle . |
| 3,629,909 | 12/1971 | Riley . |
| 4,637,098 | 1/1987 | Okura et al. . |
| 4,939,821 | 7/1990 | Frank, Jr. . |
| 5,142,745 | 9/1992 | Setty et al. ........................ 24/136 R |

FOREIGN PATENT DOCUMENTS

| | | | |
|---|---|---|---|
| 2108227 | 9/1972 | Fed. Rep. of Germany ........ 174/41 |
| 747691 | 4/1956 | United Kingdom .................. 174/41 |

*Primary Examiner*—James R. Brittain
*Attorney, Agent, or Firm*—Jenner & Block

[57] ABSTRACT

A drop wire clamp assembly is disclosed which is particularly suited for clamping twin or "figure eight" drop wires having a conducting line and adjacent a support line. The support line is sandwiched between bail housing and a slide wedge assembly. The conducting line is cradled along an elongated side of the bail housing. Guiding assemblies at each opposite end of the bail housing hold the support line in center alignment with a gripping surface, which is located in the bail housing.

35 Claims, 3 Drawing Sheets

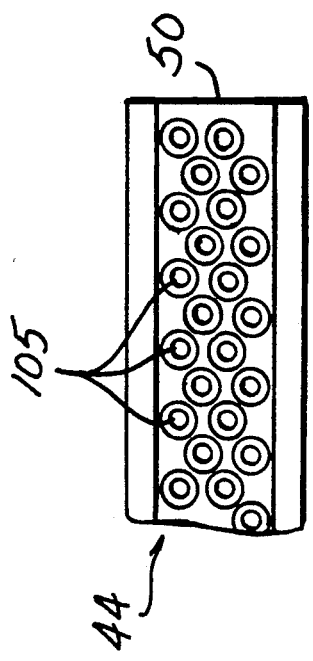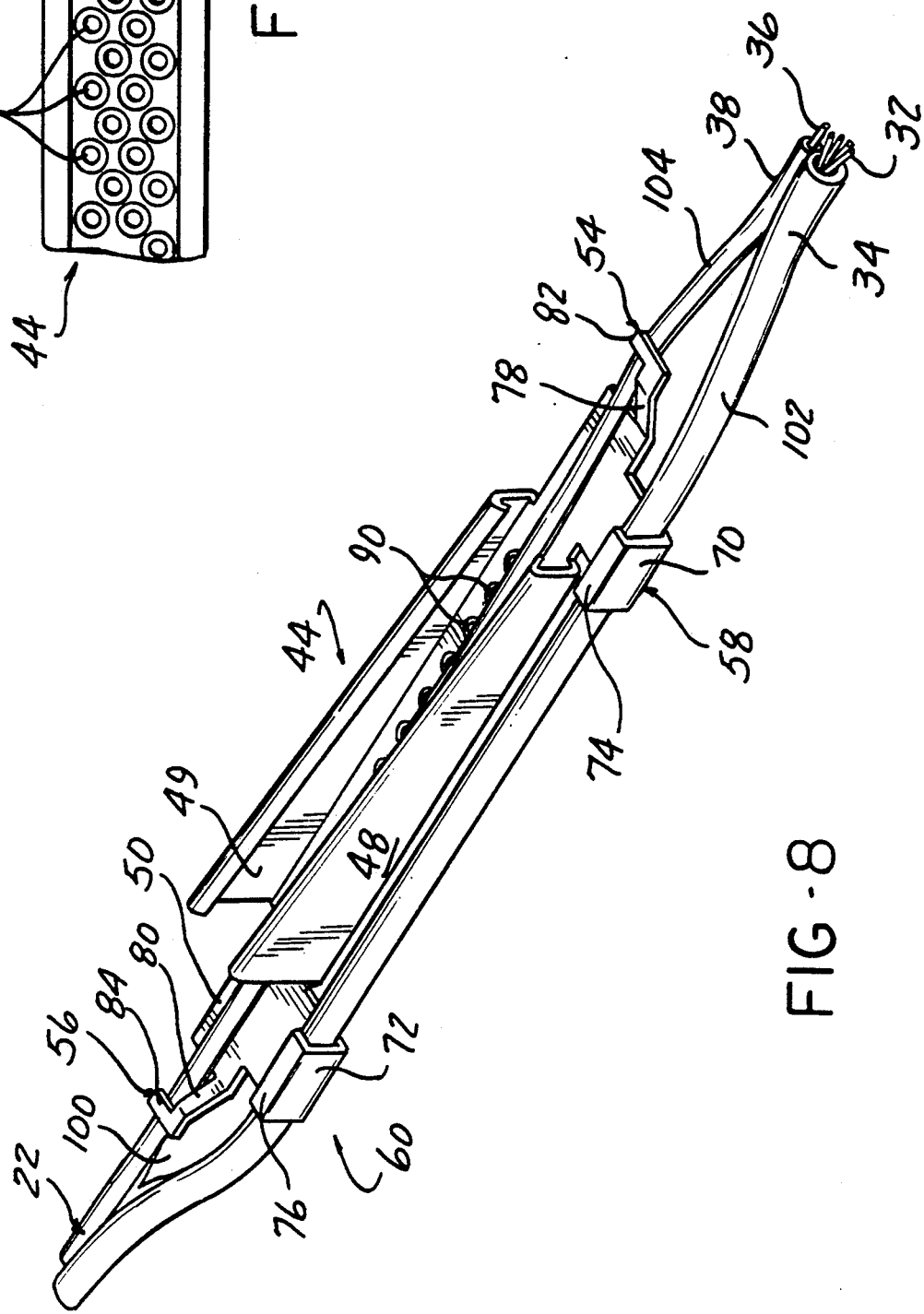

TWIN DROP WIRE CLAMP ASSEMBLY AND METHOD

FIELD OF THE INVENTION

This invention relates to a drop wire clamp assembly which is used to support an insulated twin drop wire relative to a structure such as a pole or building.

BACKGROUND OF THE INVENTION

Typically, a drop wire clamp assembly is used to support the telephone drop wire which is an insulated telephone cable which is strung between a pole and a building. The drop wire clamp assembly has a wire or cable which attaches to the structure so as to bear the weight of the suspended telephone drop wire where the telephone cable reaches the building or telephone pole. The clamp assembly should firmly grip and hold the drop wire even under great tension. However, the grip must be made without breaking or cutting the insulation of the drop wire, which could cause failure of the telephone service.

Drop wire clamp assemblies typically comprise a wedge-shaped bail housing having a series of ridges, and a wedge-shaped slide which mates with the housing to locate the insulated drop wire therebetween. A wire loop extends from the wedge slide for connection to the structure. The bail housing and wedge slide are all formed of stainless steel or other metal. A shim or pressure pad having a large number of perforations may be located between the wedge slide and the drop wire, and may have retaining ears which prevent the shim from moving longitudinally. As the wedge slide is slid to the bail housing, the shim presses into the insulation of the drop wire to firmly grip and hold the drop wire.

While the foregoing technique is suitable for many types of wires and lines, it is less desirable for use with certain reinforced lines. These reinforced lines are used when a line must span a long distance between supporting members, such as poles. In such long spans, conducting wires alone cannot withstand the tension forces caused by their own weight. Thus, a thin metal support member or cable is provided to reinforce the conducting wires. In the twin or "figure eight" configuration, these reinforced lines have a number of conducting wires which are contained in a first cylindrical insulating sleeve, and a thin metal support wire which is contained in a second cylindrical insulating sleeve. The two insulating sleeves are integrally joined, so that the cross-section of the reinforced line has a figure eight shape. The term "figure eight wire" or "figure eight drop wire" as used herein refers to reinforced line having a configuration as described above.

When the above-described drop wire clamp assembly is used to clamp a reinforced line, such as a figure eight wire, the presence of the support wire creates several problems. First, the support wire makes the line bulky and cumbersome to handle when applying the clamp. Second, the thickness of the support wire reduces the effectiveness of the clamp. Third, the support wire, when inserted into the clamp with the conducting wires, tends to crush the conducting wires, thereby increasing the chances of a short circuit or other failure.

Ideally, a drop wire clamp suitable for figure eight drop wires should clamp the support line without clamping the conducting wires.

SUMMARY OF THE INVENTION

In accordance with the present invention, an improved drop wire clamp is provided which is especially suited for supporting reinforced or figure eight drop wires having a conducting wire portion and a support wire portion.

The improved drop wire clamp includes a bail housing which has a gripping surface and a wedge-shaped slide assembly which engages the bail housing. After the support wire portion of the drop wire is placed inside the bail housing, the slide assembly is engaged with the bail housing to push the support wire portion against the gripping surface. Unlike the support wire portion, the conducting wire portion of the drop wire is not clamped. Rather, it is placed in cradling assemblies along an elongated side of the bail housing. Guiding assemblies at each opposite end of the bail housing hold the support wire portion in center alignment with the gripping surface. Centering the support wire portion in this manner strengthens the gripping surface's hold.

In one embodiment, the bail housing is formed by a pair of side walls and a center base. The walls and base extend lengthwise to create a channel with a U-shaped cross section. Additionally, the side walls are wedge-shaped, and their upper edges have tracks for engaging the slide assembly. The gripping surface consists of a line of oval-shaped holes, each upwardly punched through the base and extending across most of the base width. The ovals have smooth edges, and their elongated axes are transverse to the direction which the support wire portion runs through the bail housing.

The slide assembly is also made up of a pair of wedge-shaped side walls and a center base. A wire loop extends from the slide assembly for attachment to hooks which may be mounted to a building or pole. When the support wire portion is placed on the base of the bail housing, the slide assembly is engaged to press the support wire portion between the gripping surface of the bail housing and the center base of the slide assembly.

A pair of L-shaped guiding assemblies is attached, one at each end, to the base of the bail housing. These guiding assemblies keep the support wire portion centered as it passes over the gripping surface of the bail housing. Typically, the drop wire is manufactured with the conducting wire portion integrally joined with the support wire portion. Therefore, a longitudinal slit must be made in the drop wire to separate the conducting and support wire portions for installation in the clamp. Preferably, this slit is somewhat longer than the distance between the guiding assemblies. Thus, the guiding assemblies by fixing the position of the support wire portion also help prevent this slit from prorogating down the length of the drop wire.

A pair of cradling assemblies extend off to one of the elongated sides of the bail housing. These cradling assemblies hold the conducting portion of the drop wire. Thus, the conducting portion does not pass through the bail housing and is not clamped. The cradling assemblies are generally C-shaped in cross section. They include a tray on which the conducting wire portion rests. A side wall extends up from the tray and abuts the conducting wire portion. A lip extends from top edge of the side wall over the conducting wire portion. The side wall is somewhat shorter than the diameter of the conducting wire portion, so the lip presses into and holds the conducting wire portion.

In another embodiment, a shim is inserted into the bail housing between the support wire and the slide assembly. The shim has a gripping surface which is pressed against and firmly holds the support wire portion. In yet another embodiment, the gripping structure is a series of ridges or small round holes in the base of bail housing. In still yet another embodiment, alternative guiding assemblies are provided which include a pair of elongated members extending upwardly from the base of the bail housing. The pair of elongated members defines a slot in which the support wire is placed. In certain applications, these alternative guiding assemblies are more effective than the L-shaped guiding assemblies described above.

In accordance with the invention, a more reliable figure eight drop wire clamp is provided by clamping only the support wire of the drop wire and cradling the conducting wire portion alongside the clamp. In this manner, the support wire portion bears tension forces which would otherwise be borne by the conducting wire portion. Moreover, by not clamping the conducting wire portion, the clamp is less prone to crushing or otherwise damaging the conducting wire portion, thereby reducing the likelihood of a short circuit or other failure.

DESCRIPTION OF THE DRAWINGS

FIG. 8 is an enlarged perspective view of the bail housing of FIG. 3 showing a figure eight drop wire mounted therein;

FIG. 9 is a top plan view of an alternative embodiment of the bail housing shown on FIG. 3.

DESCRIPTION OF THE PREFERRED EMBODIMENTS

Figure 1:
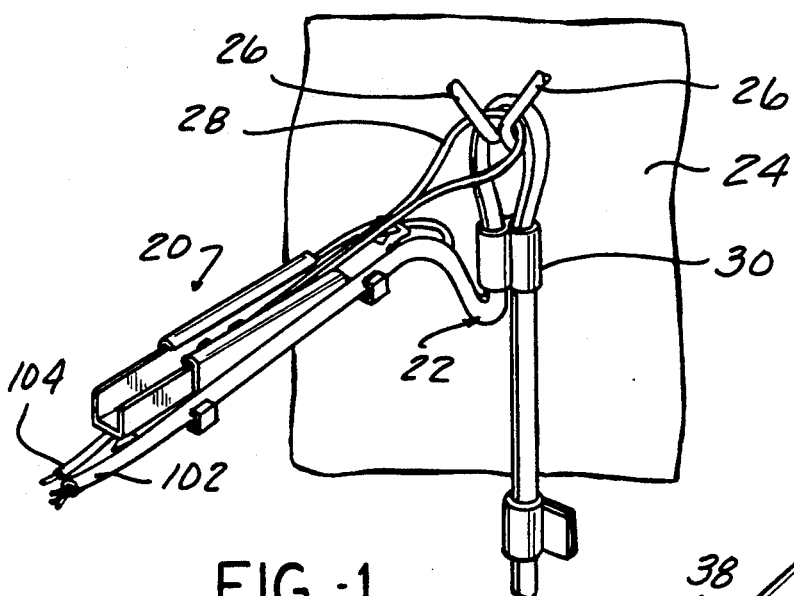
FIG. 1 is a perspective view of the assembled twin drop wire clamp assembly shown in position supporting an insulated figure eight drop wire at the position where the drop wire is secured to a structure.

Referring to FIG. 1, a novel twin drop wire clamp assembly 20 is illustrated which secures and supports an insulated figure eight drop electric line 22 relative to a structure 24 to which the line is being run. For example, electric line 22 may be a telephone service drop wire being strung between a telephone pole and a building. Structure 24 can either be a telephone pole or the building, and has a pair of hooks 26 secured to the structure. A wire loop 28 extends from clamp 20 to engage hooks 26. Electric line 22 is partially sandwiched between clamp 20 which serves to take the tension off electric line 22 where it connects to the structure. Electric line 22 itself is looped around hooks 26 and then continues through a collar 30 to its destination (not shown).

Figure 2:
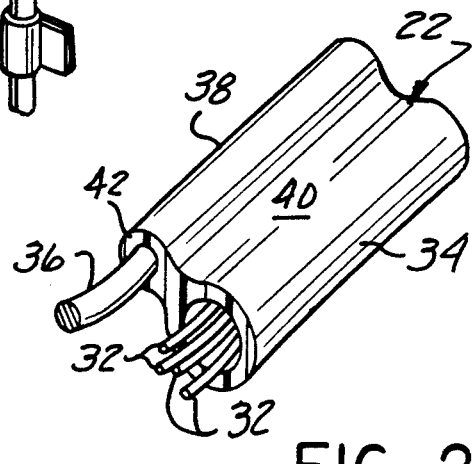
FIG. 2 is a perspective, partial cross-sectional view of a figure eight drop wire.

FIG. 2 illustrates electric line 22 in greater detail. Electric line 22 has a figure eight cross-sectional configuration, and comprises a plurality of conventional insulated conducting members 32 surrounded by a first insulation sleeve 34, and an adjacent support member 36 surrounded by a second insulation sleeve 38. First and second sleeves 34 and 38 each have generally circular cross-sections, and are integrally joined together along a region 40. Region 40 is composed of insulating material located between conducting members 32 and support member 36. In this manner, the cross-section 42 of electric line 22 resembles a figure eight. It should be noted that the support member 36 while preferably made of metal or other strong material is not intended to be a conductor. The figure eight configuration is used when conducting members 32 alone could not withstand the tension placed on electric line 22. This tension is caused by the weight of electric line 22 when electric line 22 spans a long distance between supports, such as poles. It can also be caused by wind or the weight of ice which accumulates on electric line 22. By use of support member 36, the overall electric line 22 is able to withstand this tension.

Figure 3:
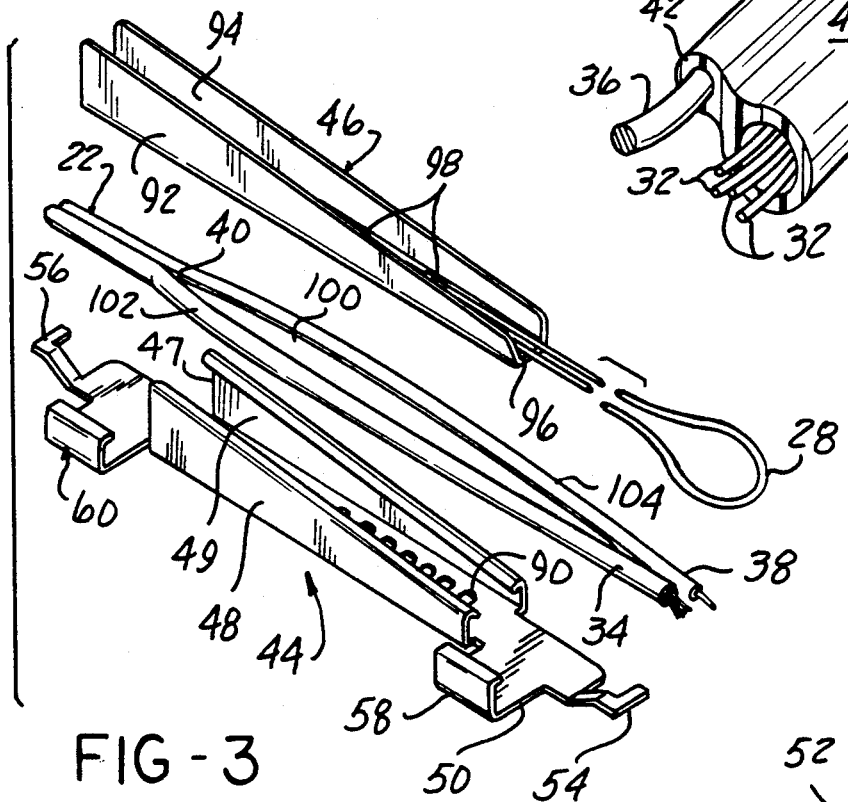
FIG. 3 is an exploded perspective view of the twin drop wire clamp assembly of FIG. 1.

As seen in FIG. 3, clamp assembly 20 has a wedged-shaped bail housing 44 and a matching wedge-shaped slide assembly 46. Slide assembly 46 includes wire loop 28 for securing clamp 20 to hooks 26. Preferably, bail housing 44 and slide assembly 46 are made of stainless steel. As discussed below in greater detail, first sleeve 34 containing conducting members 32 of electric line 22, is cradled along the side of bail housing 44. Second sleeve 38 containing support member 36 is sandwiched in interior channel 47 between bail housing 44 and slide assembly 46.

Bail housing 44, seen best in FIGS. 3 through 6, is U-shaped in cross-section and has a pair of side walls 48 and 49 and a center base 50. Side walls 48 and 49 extend along a longitudinal direction in a wedge shape. The top ends of side walls 48 and 49 are bent inwardly to form a pair of tracks 52 for guiding the slide assembly as described below. Center base 50 is longer than side walls 48 and 49 and extends beyond side walls 48 and 49 at both longitudinal ends of bail housing 44.

Bail housing 44 further includes guiding assemblies 54 and 56 and cradling assemblies 58 and 60.

Figure 6:
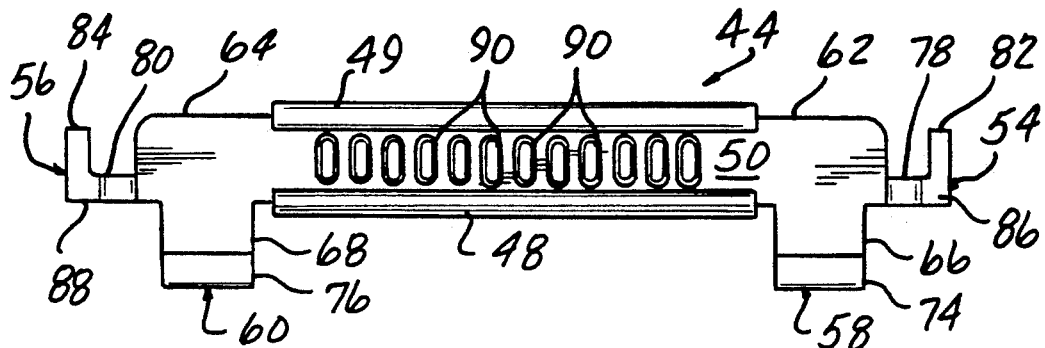
FIG. 6 is a top plan view of the bail housing shown in FIG. 3.

As best seen in FIG. 6, cradling assemblies 58 and 60 extend from opposite ends 62 and 64, respectively, of base 50. Cradling assemblies 58 and 60 are of identical construction and are suitable for cradling or carrying insulated conducting wire members 32 in an unclamped portion while the immediately adjacent support member 36 portion of line 22 is clamped in bail housing 44 as hereinafter described. Cradling assemblies 58 and 60 comprise trays 66 and 68, side walls 70 and 72, and lips 74 and 76, respectively. Trays 66 and 68 are generally rectangular and coplanar with base 50. Trays 66 and 68 extend in a direction transverse to the longitudinal axis of bail housing 44 at opposite ends 62 and 64, respectively, and along a common side of base 50. Side walls 70 and 72 extend upwardly from and are perpendicular to trays 66 and 68, respectively. Lips 74 and 76 extend toward bail housing 44 from the upper edges of side walls 70 and 72, respectively. Lips 74 and 76 are generally parallel to and shorter than trays 66 and 68.

Guiding assemblies 54 and 56 are of similar construction. Guiding assemblies 54 and 60 are L-shaped tabs which extend from opposite ends 62 and 64, respectively, of base 50. Each of guiding assemblies 54 and 56 has an elongated member 78 and 80, and guiding arms 82 and 84, respectively. Guiding assemblies 54 and 60 each abut the common side of base 50 from which trays 66 and 68 extend.

Figure 7:
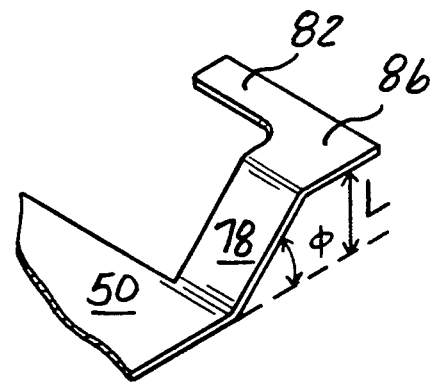
FIG. 7 is an enlarged perspective view of the guiding assembly shown in FIG. 4.

Elongated members 78 and 80 have a length slightly longer than the diameter of second sleeve 38 of electric line 22, and have a width which is approximately one-fourth the width of base 50. Elongated members 78 and 80 extend upwardly at an acute angle from base 50 and outwardly in a direction generally parallel to the longitudinal axis of base 50. The ends of elongated members 78 and 80 which are remote from base 50 are bent to form surfaces 86 and 88, respectively. Surfaces 86 and 88 are generally coplanar with base 50. Guiding arms 82 and 84 extend from and are coplanar with surfaces 86 and 88, respectively. Guiding arms 82 and 84 extend away from cradling assemblies 58 and 60 in a direction perpendicular to the longitudinal axis of base 50. Guiding arms 82 and 84 are preferably equal in length to one half the width of base 50. For clarity, FIG. 7 shows an enlarged view of guiding assembly 54 depicting elongated member 78, surface 86 and guiding arm 82. Note that elongated member is at an acute angle $\Phi$ and relative to the plane of base 50. As illustrated in FIG. 7, angle $\Phi$ is about 30°.

In the preferred embodiment, bail housing 44 also includes a gripping means formed in the thin center base by a plurality of apertures 90 which extend through the base 50. In a preferred embodiment, apertures 90 as seen in FIG. 6 comprises a series of elongated slots or perforations of oval shape having their elongated axis transverse to the direction of electric wire 22 when located within the interior channel formed by the side walls 48, 49 and base 50 of bail housing 44. The oval shaped slots extend across the entire width of the base member and thus will engage electric line 22 even if located at an angle within the elongated channel or located more to one side than the other.

The oval slots are formed by punching U-shaped bail housing 44 from the bottom and then simultaneously flattening the punched edges within the interior channel, so that the tops of the edges are flat. The flattened tops eliminate jagged edges which could dig into the insulation of electric line 22. While apertures formed entirely through the housing are economical to create, it will be understood that the apertures could be formed as recesses in a thicker base, having a depth sufficient to retain and hold the insulation therein.

Slide wedge assembly 46 is best seen in FIG. 3. It consists of a U-shaped member preferably constructed of stainless steel having a pair of side walls 92, 94 and a center base 96. Side walls 92, 94 extend in a wedge shape which compliments wedge-shaped bail housing 44. An interior channel is formed between side walls 92, 94 and base 96, in which wire loop 28 is mounted. It is important, as it will appear, that the bottom of center base 96 be smooth. Thus, center base is punched upwardly from the bottom surface to define a pair of hoops 98 into which are slid the ends of wire loop 28. Hoops 98 are then crimped or staked into place so that the wire loop 28 can withstand considerable separation force, such as in excess of 500 pounds, without breaking, slipping or pulling out. Other conventional methods can be used to mount wire loop 28 so long as the bottom surface of center base 96 is smooth.

Understanding operation of present clamp assembly 20 is facilitated by comparing it with the prior art. A typical prior art assembly did not include guiding assemblies 54 and 56 or cradling assemblies 58 and 60. Therefore, both the conducting members 32 and support member 36 had to be placed in between the slide assembly 46 and bail housing 44. Because of the combined thickness of the conducting men%bets 32 and support member 36, the effectiveness of prior art clamps was diminished.

The improved operation of present clamp assembly 20 provides improved clamping compared to the prior art. Use of clamp 20 is now described. Prior to inserting electric line 22 into the clamp 20, a longitudinal slit 100 is formed through electric line 22 in region 40 for a distance slightly greater than the distance between guiding assemblies 54 and 56. Slit 100 separates along its length first and second sleeves 34 and 38 into a first and second wire portions 102 and 104, respectively, as shown in FIGS. 3 and 8.

Figure 5:
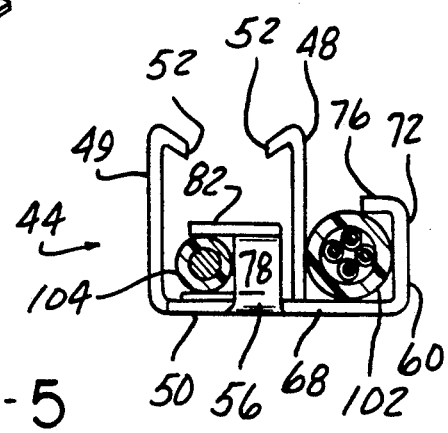
FIG. 5 is a side view of the bail housing shown in FIG. 3, showing a cross-section of a figure eight wire mounted therein
Figure 4:
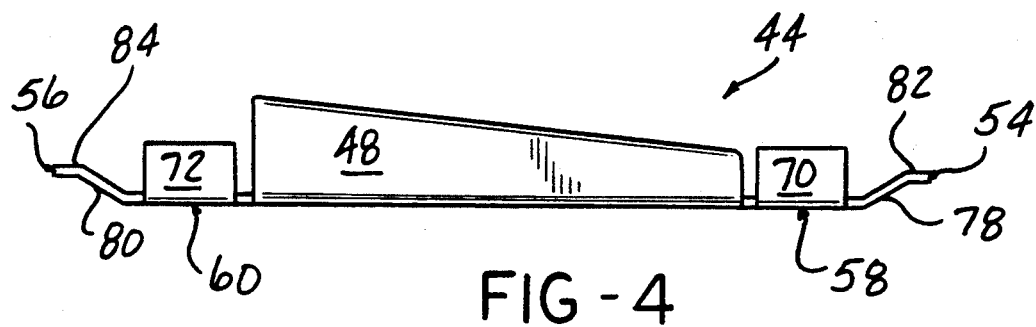
FIG. 4 is a front view of the bail housing shown in FIG. 3.

As best shown in FIG. 8, second wire portion 104 of electric line 22 (containing support member 36) is placed within bail housing 44 against plurality of apertures 90. The ends of second wire portion 104 which protrude from bail housing 44 are then run underneath guiding arms 82 and 84 so that second wire portion 104 abuts elongated members 78 and 80. The vertical distance L (see FIG. 7) between the plane of base 50 and each of guiding arms 82 and 84 should be slightly less than the diameter of second wire portion 104. Thus, guiding arms 82 and 84 will extend into and compress the insulation sleeve of second wire portion 104, thereby firmly holding second wire portion 104 in center alignment within bail housing 44. This alignment improves the effectiveness of clamp 20. For clarity, FIG. 5 illustrates a sectional view of one end of second wire portion 104 passing under guiding arm 82.

Slit 100 should extend only a short distance beyond each of guiding arms 82 and 84. By holding second wire portion 104 in a fixed position, guiding arms 82 and 84 also help prevent slit 100 from spreading down electric line 22.

First wire portion 102 of electric line 22 (containing conducting member 32) is not placed inside bail housing 44. Rather, it is cradled alongside bail housing 44 by cradling assemblies 58 and 60. Specifically, first wire portion 102 is laid over trays 66 and 68 and pressed against side walls 70 and 72. Preferably side walls 70 and 72 have a height slightly less than the diameter of first wire portion 102 so that lips 74 and 76 extend into and compress the insulation sleeve of first wire portion 102, thereby firmly holding first wire portion 102. For clarity, FIG. 5 illustrates a sectional view of one end of first wire portion 102 passing under lip 76.

The installer then places slide assembly 46 within bail housing 44 and pulls wire loop 28 toward guiding assemblies 54. The bottom of slide assembly 46 slides longitudinally along second wire portion 104 of electric line 22 while simultaneously pressing second wire portion 104 against plurality of apertures 90 causing part of first insulation sleeve 34 to extend into apertures 90. This firmly clamps second wire portion 104 of electric line 22 within the assembly but without electric line 22 moving in a sliding motion relative to any sharp edges. Thus, a firm connection is made without cutting into first insulation sleeve 34.

A number of modifications can be made to the improved drop wire clamp assembly without departing from the present invention. For example, while bail housing 44 is illustrated as having a plurality of oval shaped elongated slots therein, it can be formed by a plurality of circular holes 105 as illustrated in FIG. 9. The plurality of holes are plunged from the bottom, and flattened on the inside, similar to that described in FIG. 6 for the oval slots. At least two holes are located across the width of base 50, and a large number of holes is located along the length thereof. The large number of holes thus engage drop wire 22 regardless of any angle or slant to the interior channel of bail housing 44.

Figure 10:
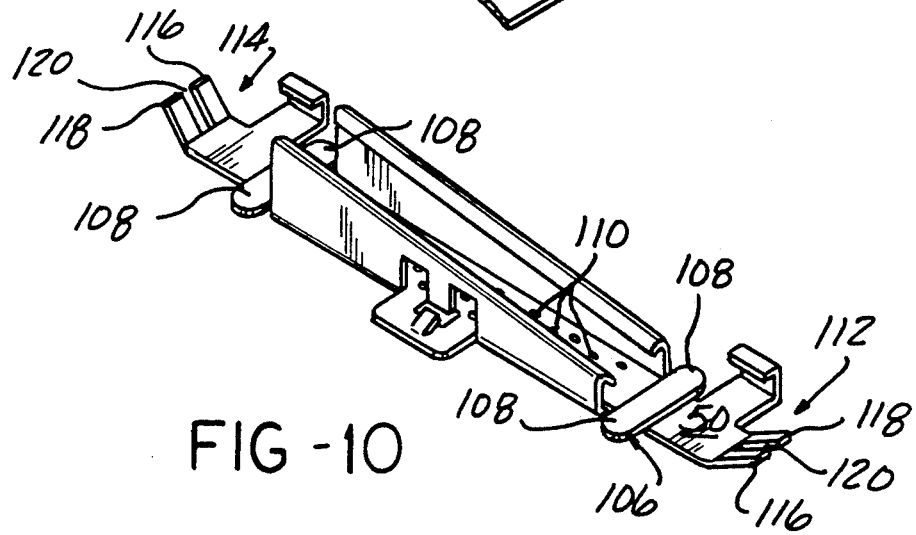
FIG. 10 is a perspective view of an alternative embodiment of the bail housing shown in FIG. 3.

FIG. 10 shows an alternative embodiment of the invention in which a pressure pad or shim 106 may also be provided. Shim 106 is preferably formed of stainless steel and terminates at each end in a pair of extending ears 108 with rounded corners. Ears 108 are located so as to capture shim 106 within the open channel of bail housing 44, so as to limit longitudinal motion of shim 106 within bail housing 44. In addition, rounded ears 108 allow the installer to hold and tilt pad 106 within the open channel. Shim 106 has a large number of holes or perforations 110 located thereon. In operation, shim 106 is placed between the drop wire and the slide assembly 46, so that when the slide assembly 46 is engaged with the bail housing, second wire portion 104 is shimmed between the interior channel 47 of bail housing 44 and shim pad 106.

Also illustrated in FIG. 10 are alternative guiding assemblies 112 and 114. Guiding assemblies 112 and 114 can be used with or without a shim, such as shim 106. Guiding assemblies 112 and 114 serve the same function as guide assemblies 54 and 56, respectively, but are of different construction. As shown in FIG. 10, each of guiding assemblies 112 and 114 has a pair of elongated members 116 and 118, which extend upwardly and outwardly from opposite ends of base 50. Elongated members 116 and 118 are spaced in parallel relation to define a slot 120 therebetween for receiving second wire portion 104.

It will be observed that the guiding assemblies 112 and 114 differ from the guiding assemblies 54 and 56 in that guiding assemblies 112 and 114 each have a second elongated member such as member 118 in lieu of a transverse guiding arm such as guiding arm 82. As stated above and illustrated in FIG. 5, guiding assemblies 54 and 56 are most useful when second wire portion 104 is of sufficient thickness so as to be compressed and firmly held by guiding arms 82 and 84. However, if second wire portion 104 is not of sufficient thickness, guiding arms 54 and 56 may be unable to firmly hold it. Often, the precise thickness of second wire portion 104 will not be known in advance when manufacturing clamp 20.

To better accommodate thinner support members, the alternative guiding assemblies 112 and 114 have two elongated members 116 and 118. The second wire portion 104 is placed in slot 120 between the two elongated members 116 and 118 so that excessive lateral movement is prevented, even if the width of slot 120 exceeds the diameter of second wire portion 104.

While the illustrated shapes and configuration of guiding assemblies 54 and 56 and cradling assemblies 58 and 60 are preferred, other alternatives are possible and may be used. For example, additional cradling assemblies such as cradling assemblies 58 and 60 can extend from bail housing 44. Alternatively, a single cradling assembly could run along the entire length of bail housing 44. Moreover, lips 74 and 76 can be angled slightly downward toward base 50 to strengthen their respective grips on second wire portion 104. The cradling assemblies could be C-shaped, or lips, such as lips 74 and 76, could extend from bail housing 44 in addition to or in place of trays 66 and 68. Finally, while the elongated members 116 and 118 are illustrated in FIG. 10 as forming an obtuse angle with base 50, elongated members 116 and 118 could also form right or acute angles with base 50.

Other modifications which can be made within the scope of the present invention will be understood in view of the foregoing. It is desired not to limit the invention to the embodiments illustrated as it will be apparent that a number of modifications can be made therein.

I claim:

1. A drop wire clamp for supporting an insulated wire having an electrically conducting wire portion and an adjacent supporting wire portion separated by insulating material, comprising:
   an elongated wedge-shaped bail housing having a gripping surface capable of receiving thereon the supporting wire portion;
   a wedge-shaped slide engagable with said bail housing for pressing the supporting wire portion against said gripping surface;
   cradling means for cradling the conductive wire portion along an elongated side of said bail housing; and
   guiding means for holding the supportive wire portion in alignment with said gripping surface, said guiding means being attached to one longitudinal end of said bail housing; wherein said guiding means are attached at each opposite end of said bail housing.

2. The drop wire clamp according to claim 1 wherein the cross-sectional shape of said slide is complementary to the cross-sectional shape of said bail housing.

3. The drop wire clamp according to claim 1 wherein said gripping surface is a shim having a gripping surface.

4. A drop wire clamp for supporting an insulated wire connected to a structure, the wire having an electrically conducting wire portion and an adjacent supporting wire portion separated by insulating material, comprising:
   a bail housing having a U-shaped cross-section formed by a pair of side walls and a center base, the side walls and center base extending longitudinally to create an interior channel therebetween, the side walls further extending longitudinally in a wedge shape, and the center base having a gripping surface;
   a slide assembly having an elongated wedge shape engagable with said bail housing and a wire loop extending therefrom for attachment to the structure;
   mating means for pressing the supporting wire portion against said gripping surface when the supporting wire portion is located in said interior channel and said slide assembly is engaged with said bail housing;
   cradling means for holding the conducting wire portion along an elongated side of said bail housing; and
   guiding means for holding the supportive wire portion in alignment with the center of said interior channel, said guiding means being attached to said bail housing on at least one longitudinal end of said base; wherein said guiding means comprises an elongated member extending upwardly from an end of said bail housing at an angle to the plane of said center base.

5. The drop wire clamp according to claim 4 wherein said gripping surface comprises a plurality of apertures formed in said center base.

6. The drop wire clamp according to claim 5 wherein said plurality of apertures are formed in said center base by punched perforations extending into said interior channel, with the extending portions of said perforations being flattened to create a gripping surface without sharp edges.

7. The drop wire clamp according to claim 4 wherein said gripping surface is a plurality of elongated oval slots extending across the width of said base and having elongated axes in a direction transverse to the longitudinal axis of said base.

8. The drop wire clamp according to claim 4 wherein said gripping surface comprises a plurality of ridges in said center base.

9. The drop wire clamp according to claim 4 wherein said gripping surface comprises a shim having a gripping surface.

10. The drop wire clamp according to claim 4 wherein said guiding means further comprise a second elongated member extending from said first elongated member in a direction transverse to the longitudinal center axis of said interior channel.

11. The drop wire clamp according to claim 4 wherein said guiding means further comprise a second elongated member extending upwardly from said end of said bail housing in spaced relation to said first elongated member for defining a slot therebetween for receiving the supporting wire.

12. The drop wire clamp according to claim 4 wherein said cradling means comprises a tray extending from and coplanar with said center base, said tray extending in a direction perpendicular to the longitudinal axis of said center base.

13. The drop wire clamp according to claim 12 wherein said cradling means further comprises a side wall extending upwardly from said tray.

14. The drop wire clamp according to claim 13 wherein said cradling means further comprises a lip extending outwardly toward said bail housing from the upper end of said side wall.

15. The drop wire clamp according to claim 14 wherein said lip is shorter than said tray.

16. A method of clamping a telephone drop wire having a supporting wire portion and an adjacent conducting wire portion, and having a region of insulating material separating the supporting and conducting wire portions for subsequent connection of the drop wire clamp to a support, comprising the steps of:
providing a telephone drop wire clamp comprising an elongated wedge-shaped bail housing a gripping surface therein capable of receiving thereon the supporting wire portion and a wedge-shaped slide engagable with said bail housing for pressing the supporting wire portion against said gripping surface;
longitudinally slitting the telephone drop wire in the region of insulating material for a distance equal to the length of said bail housing to provide a continuous slit therethrough, said slit separating the supporting and conducting wire portions along said distance;
laying the separated section of the supporting wire portion flat along said gripping surface within said bail housing;
engaging said wedge-shaped slide with said bail housing;
sliding the slide assembly longitudinally along the supportive wire portion to press said portion against said gripping surface; and
placing the separated section of the conducting wire portion alongside said bail housing.

17. The method according to claim 16 further comprising the steps of:
providing cradling means along an elongated side of said bail housing; and
placing the separated portion of said conducting wire portion in said cradling means.

18. The method according to claim 17 further comprising the steps of:
providing guiding means on one or more ends of said adjustable clamp.

19. A clamped figure eight telephone drop wire assembly comprising:
an insulated wire having an electrically conducting wire portion and an adjacent supporting wire portion separated by insulating material;
an elongated wedge-shaped bail housing having a gripping surface therein capable of receiving thereon said supporting wire portion;
a wedge-shaped slide engagable with said bail housing for pressing the supporting wire portion against said gripping surface; and
cradling means for holding the supporting wire portion along an elongated side of said bail housing;
wherein a portion of said insulated wire is longitudinally slit for at least a distance equal to the length of said bail housing to create separated supporting and conducting wire portions along said distance; and said separated portion of said conducting wire portion is disposed along said bail housing in said cradling means, and said separated portion of said supporting wire portion is disposed within said bale housing on said gripping surface.

20. The drop wire clamp according to claim 19 further comprising:
guiding means for holding the supporting wire portion in alignment with the center of said interior channel, said guiding means being attached to one longitudinal end of said bail housing.

21. The drop wire clamp according to claim 19 wherein said gripping surface is a shim having a gripping surface.

22. A drop wire clamp for supporting an insulated wire connected to a structure having an electrically conducting wire portion and an adjacent supporting wire portion separated by insulating material, comprising:
an elongated wedge-shaped bail housing having a gripping surface capable of receiving thereon the supporting wire portion;
a wedge-shaped slide engagable with said bail housing for pressing the supporting wire portion against said gripping surface; and
a cradle connected to an elongated side of said bail housing and adapted for holding the conducting wire with a grip of constant force that does not tighten as a tension force imposed on the insulated wire increases.

23. A drop wire clamp for connecting an insulated wire that is under tension to a support structure, the wire having an electrically conducting wire portion and an adjacent supporting wire portion separated by insulating material, comprising:

a clamp having attachment means for attaching said clamp to the support structure, and clamping means for receiving the supporting wire portion and applying a clamping grip to the supporting wire portion that tightens as the tension force imposed on the insulated wire increases; and cradle means connected to said clamp for snugly holding the conducting wire portion alongside of said clamp so as to relieve the tension force imposed on the insulated wire portion; wherein said cradle means holds the conducting wire portion in a cradling grip that does not tighten as the tension force imposed on the insulated wire increases.

24. The drop wire clamp of claim 23 wherein said attachment means comprises a wire loop extending from said clamp for engagement with the support structure.

25. The drop wire clamp of claim 23 wherein said clamping means comprises:

an elongated wedge-shaped bail housing defining an elongated channel having a gripping surface; and a slide assembly having an elongated wedge shape engagable with said bail housing to press the supporting wire portion against said gripping surface.

26. The drop wire clamp of claim 25 further comprising guiding means for holding the supporting wire portion in alignment with the center of said channel, said guiding means being attached on at least one longitudinal end of said bail housing.

27. The drop wire clamp according to claim 26 wherein said guiding means comprises an elongated member extending upwardly from a longitudinal end of said bail housing.

28. The drop wire clamp according to claim 27 wherein said guiding means further comprises a second elongated member extending from said first elongated member in a direction transverse to the longitudinal axis of said channel.

29. The drop wire clamp according to claim 27 wherein said guiding means further comprises a second elongated member extending upwardly from said end of said bail housing in spaced relation to said first elongated member to define a slot therebetween capable of receiving the supporting wire portion.

30. The drop wire clamp according to claim 23 wherein said cradle comprises a tray extending from the side of said clamp.

31. The drop wire clamp according to claim 30 wherein said cradle further comprises a side wall extending upwardly from said tray.

32. The drop wire clamp according to claim 31 wherein said cradle further comprises a lip extending from the upper end of said side wall.

33. The drop wire clamp according to claim 32 wherein said lip and said tray occupy substantially parallel planes and are spaced apart to receive therebetween the conducting wire portion.

34. A clamped figure eight drop wire assembly comprising:

an insulated wire having an electrically conducting wire portion and an adjacent supporting wire portion separated by insulating material;

clamp means for clamping said supporting wire portion;

attachment means connected to said clamp for attaching said clamp to a structure;

holding means for holding the supporting wire portion alongside said clamp means;

wherein a longitudinal slit is formed in the insulating material of said insulated wire between said supporting and conducting wire portions for a distance at least equal to the length of said clamp means; and said supporting wire portion adjacent said slit is clamped by said clamp means.

35. A method of clamping a telephone drop wire having a supporting wire portion and an adjacent conducting wire portion, and having a region of insulating material separating the supporting and conducting wire portions for subsequent connection of the drop wire clamp to a support structure, comprising the steps of:

providing a clamp suitable for clamping the supporting wire portion in a clamping grip;

longitudinally slitting the telephone drop wire in the region of insulating material for a distance equal to the length of said clamp to provide a continuous slit therethrough, said slit separating the supporting and conducting wire portions along said distance;

clamping the separated section of the supporting wire portion with said clamp;

attaching said clamp to the support structure; and placing the separated section of the conducting wire portion alongside said clamp so as to be outside of said clamping grip.

* * * * *